US010177479B2

(12) United States Patent
Saka et al.

(10) Patent No.: US 10,177,479 B2
(45) Date of Patent: Jan. 8, 2019

(54) TERMINAL PAIR AND CONNECTOR PAIR INCLUDING TERMINAL PAIR

(71) Applicants: AUTONETWORKS TECHNOLOGIES, LTD., Yokkaichi-shi, Mie (JP); SUMITOMO WIRING SYSTEMS, LTD., Yokkaichi-shi, Mie (JP); SUMITOMO ELECTRIC INDUSTRIES, LTD., Osaka-shi, Osaka (JP)

(72) Inventors: Yoshifumi Saka, Mie (JP); Masayuki Ookubo, Mie (JP); Hajime Watanabe, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 155 days.

(21) Appl. No.: 15/301,309

(22) PCT Filed: Mar. 25, 2015

(86) PCT No.: PCT/JP2015/059123

§ 371 (c)(1),
(2) Date: Sep. 30, 2016

(87) PCT Pub. No.: WO2015/151959

PCT Pub. Date: Oct. 8, 2015

(65) Prior Publication Data

US 2017/0033486 A1 Feb. 2, 2017

(30) Foreign Application Priority Data

Apr. 3, 2014 (JP) ................................ 2014-076801

(51) Int. Cl.
*B32B 15/01* (2006.01)
*H01R 13/03* (2006.01)
(Continued)

(52) U.S. Cl.
CPC .............. *H01R 13/03* (2013.01); *C25D 5/10* (2013.01); *C25D 5/505* (2013.01); *H01R 13/04* (2013.01); *H01R 13/113* (2013.01); *C25D 5/022* (2013.01)

(58) Field of Classification Search
None
See application file for complete search history.

(56) References Cited

U.S. PATENT DOCUMENTS

2004/0229077 A1* 11/2004 Mori ..................... B32B 15/017 428/647
2008/0090096 A1 4/2008 Suzuki et al.
(Continued)

FOREIGN PATENT DOCUMENTS

CN 100583309 C 1/2010
JP 3926355 B2 6/2007
(Continued)

OTHER PUBLICATIONS

Oct. 13, 2016 International Preliminary Report on Patentability issued in International Patent Application No. PCT/JP2015/059123.
(Continued)

*Primary Examiner* — Seth Dumbris
(74) *Attorney, Agent, or Firm* — Oliff PLC

(57) ABSTRACT

A terminal pair including a first terminal provided with a first contact portion and a second terminal provided with a second contact portion. The first contact portion includes a composite covering layer having a Sn—Pd based alloy phase and a Sn phase, and has a surface including the Sn—Pd based alloy phase and the Sn phase. The second
(Continued)

contact portion includes a Cu—Sn alloy layer and a Sn layer covering part of the Cu—Sn alloy layer, and has a surface including a Cu—Sn alloy region corresponding to an exposed portion of the Cu—Sn alloy layer and a Sn region corresponding to an exposed portion of the Sn layer. A coefficient of friction for sliding movement between the first contact portion and the second contact portion is lower than a coefficient of friction for sliding movement between the two first contact portions and between the two second contact portions.

20 Claims, 6 Drawing Sheets

(51) Int. Cl.

| | |
|---|---|
| ***H01R 13/04*** | (2006.01) |
| ***H01R 13/11*** | (2006.01) |
| ***C25D 5/10*** | (2006.01) |
| ***C25D 5/50*** | (2006.01) |
| *C25D 5/02* | (2006.01) |

(56) References Cited

U.S. PATENT DOCUMENTS

| | | | | |
|---|---|---|---|---|
| 2008/0188100 | A1* | 8/2008 | Saitoh | H01R 12/585 439/82 |
| 2010/0304016 | A1 | 12/2010 | Suzuki et al. | |
| 2012/0107639 | A1* | 5/2012 | Takamizawa | C25D 5/10 428/620 |
| 2015/0133005 | A1 | 5/2015 | Saka et al. | |
| 2015/0280339 | A1 | 10/2015 | Saka et al. | |

FOREIGN PATENT DOCUMENTS

| | | | |
|---|---|---|---|
| WO | 2013/168764 | A1 | 11/2013 |
| WO | 2014/045704 | A1 | 3/2014 |

OTHER PUBLICATIONS

Jun. 9, 2015 International Search Report issued in International Patent Application No. PCT/JP2015/059123.

Feb. 24, 2018 Office Action issued in Chinese Patent Application No. 201580018327.4.

* cited by examiner

TERMINAL PAIR AND CONNECTOR PAIR INCLUDING TERMINAL PAIR

TECHNICAL FIELD

The present invention relates to a terminal pair and a connector pair including the terminal pair.

BACKGROUND ART

Cu (copper) or a Cu alloy, which has high electrical conductivity and has excellent ductility and suitable strength, is widely used as a base material for terminals used for electrical connection, for example, between electrical cables. However, Cu poses the problem of high contact resistance between terminals because of the insulating film such as an oxide film or a sulfide film formed on the surface in the service environment.

To address this problem, some terminals are provided with a Sn (tin) plated film formed by performing a plating process on the surface of the base material. Sn is softer than other metals and therefore the insulating film formed on the surface of the Sn plated film can be easily broken, for example, by sliding movement between the terminals, so that the metal Sn can be exposed. As a result, terminals having a Sn plated film on the surface can easily establish a good electrical contact.

Furthermore, to reduce the coefficient of friction for sliding movement between terminals while ensuring the contact resistance reducing effect by the Sn plated film, there is disclosed a technique in which a Cu—Sn alloy covering layer and a Sn layer are formed in order on the surface of a base material made of a Cu alloy sheet (Patent Document 1). By exposing both the Cu—Sn alloy and the Sn to the surface, the coefficient of friction can be reduced while maintaining a low contact resistance because Cu—Sn alloys are harder than pure Sn, and consequently the insertion force necessary for insertion of the terminal can be reduced.

PRIOR ART DOCUMENT

Patent Document

Patent Document 1: Japanese Patent No. 3926355

SUMMARY OF THE INVENTION

Problem to be Solved by the Invention

In recent years, a further reduction in the coefficient of friction has been strongly required as compared with conventional terminals. However, the terminals made of the conductive materials of Patent Document 1 pose a problem in that a reduction in the coefficient of friction leads to an increase in the contact resistance and therefore it is difficult to further reduce the coefficient of friction while maintaining a low contact resistance.

The present invention has been made in view of the above circumstances and is intended to provide a terminal pair having low contact resistance and a low coefficient of friction and to provide a connector pair including the terminal pair.

Means for Solving the Problem

One aspect of the present invention is a terminal pair including a first terminal provided with a first contact portion and a second terminal provided with a second contact portion, and being configured to be used by bringing the first contact portion and the second contact into contact with each other, wherein the first contact portion includes a composite covering layer formed over a first base material made of a metal, the composite covering layer including two phases that are a Sn—Pd based alloy phase and a Sn phase, one of the two phases being dispersed in the other of the two phases, the first contact portion has a surface including the Sn—Pd based alloy phase and the Sn phase, the second contact portion includes a Cu—Sn alloy layer formed over a second base material made of a metal and a Sn layer covering part of the Cu—Sn alloy layer, and the second contact portion has a surface including a Cu—Sn alloy region and a Sn region, the Cu—Sn alloy region corresponding to an exposed portion of the Cu—Sn alloy layer, the Sn region corresponding to an exposed portion of the Sn layer, and a coefficient of friction for sliding movement between the first contact portion and the second contact portion is lower than a coefficient of friction for sliding movement between the two first contact portions and between the two second contact portions.

Another aspect of the present invention is a connector pair including the terminal pair, the connector pair configured to be used by fitting a first connector including the first terminal and a second connector including the second terminal to each other.

Effects of the Invention

In the terminal pair, the first contact portion provided in the first terminal includes the composite covering layer including the Sn (tin)-Pd (palladium) based alloy phase and the Sn phase. The surface of the first contact portion includes the Sn—Pd based alloy phase and the Sn phase. As a result, the first terminal has both the effect of reducing the coefficient of friction by virtue of the relatively hard Sn—Pd based alloy phase and the effect of reducing the contact resistance by virtue of the relatively soft Sn phase.

In addition, in the surface of the second contact portion provided in the second terminal, the Cu—Sn alloy region corresponding to an exposed portion(s) of the Cu—Sn alloy layer and the Sn region corresponding to an exposed portion (s) of the Sn layer coexist. This also provides both the effect of reducing the coefficient of friction by virtue of the relatively hard Cu—Sn alloy layer and the effect of reducing the contact resistance by virtue of the relatively soft Sn layer as stated in the above.

The present inventors conducted intense research and found that, when the sliding movement occurs between the first contact portion and the second contact portion each having the particular structure as mentioned above, the coefficient of friction can be reduced further compared with the case where the first contact portions are slidingly moved against each other or the case where the second contact portions are slidingly moved against each other. While it is not clear at present by what mechanism the combined use of the first terminal and the second terminal produces the effect of reducing the coefficient of friction, the effect will be apparent from the embodiments described later.

As described above, the terminal pair has a further reduced coefficient of friction with its contact resistance maintained to be low.

Furthermore, in the connector pair, the first connector includes the first terminal and the second connector includes the second terminal. As a result, the insertion force necessary for fitting between the first connector and the second connector in the connector pair is reduced.

MODE FOR CARRYING OUT THE INVENTION

Figure 1A:
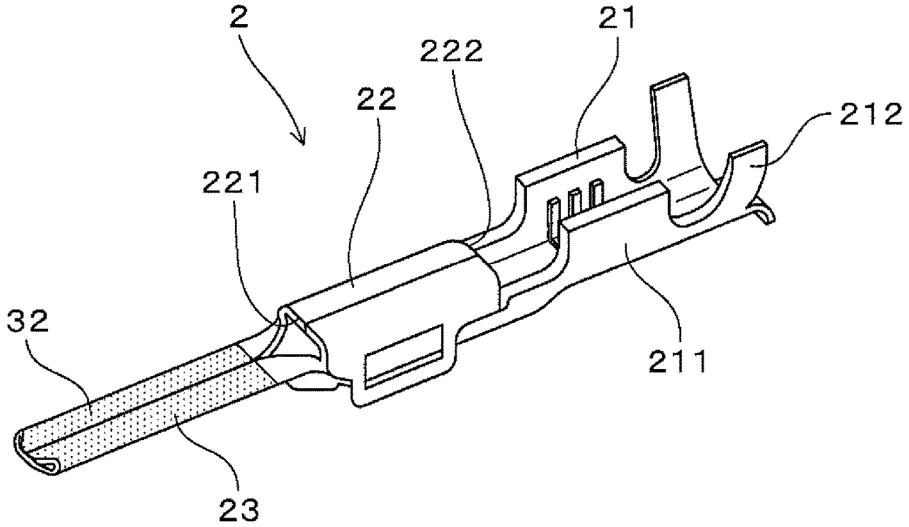
FIG. 1(*a*) is a perspective view of a first terminal and FIG. 1(*b*) is a perspective view of a second terminal, according to Embodiment 1.

The first terminal and second terminal of the terminal pair may be configured as, for example, a male terminal, a female terminal, or connector pins for PCB (Printed Circuit Board), having a known shape, depending on the intended use.

First Terminal

In the first terminal, a first base material, which forms the terminal shape, may be made of a variety of electrically conductive metals. Specifically, the first base material may be suitably formed from Cu, Al (aluminum), Fe (iron) or an alloy including any of these metals. These metal materials exhibit not only high electrical conductivity but also excellent formability and spring property, and therefore are applicable to electrical contacts in a variety of forms. Examples of the shape of the first base material include a variety of shapes such as a rod shape or a sheet shape and the dimensions including the thickness may be selected from a wide range depending on the intended use.

A first contact portion including a composite covering layer is present over the first base material. It suffices if the composite covering layer is present at least in the first contact portion but instead the composite covering layer may be present over the entire area of the first terminal. From the standpoint of wear resistance and electrical conductivity or the like, the thickness of the composite covering layer preferably ranges from 0.5 to 3 μm and more preferably ranges from 1 to 2 μm.

In the composite covering layer, the Sn phase is a phase including Sn as a main component and the Sn—Pd based alloy phase is a phase including a Sn—Pd alloy as a main component. The "main component" stated above refers to a component that is present in the greatest amount in each phase. That is, the Sn phase may include, in addition to Sn as the main component, an element that can be contained in a first intermediate layer described later, Pd that has not been incorporated into the Sn—Pd based alloy phase, an element such as Cu that constitutes the first base material, unavoidable impurities, and other substances. The Sn—Pd based alloy phase may include, in addition to the alloy as the main component alloy, an element that can be contained in the first intermediate layer, an element that constitutes the first base material, unavoidable impurities, and other substances.

The composite covering layer is structured such that one of the Sn phase and the Sn—Pd based alloy phase is dispersed in the other phase. Examples of such structures include a co-continuous structure in which one of the two phases forms a network and the other phase fills the pores and a sea-island structure in which a sea phase is formed by one of the two phases and an island phase formed by the other phase is dispersed therein. It is preferred to employ the structure in which the Sn—Pd based alloy phase is dispersed in the Sn phase when it is intended to further enhance the effect of reducing the contact resistance and the effect of reducing the coefficient of friction.

The Pd content in the composite covering layer is preferably equal to or less than 7 atomic %. Herein, the Pd content refers to the content of Pd in atomic % relative to the sum of the Sn and Pd contents in the composite covering layer. If the Pd content in the composite covering layer is greater than 7 atomic %, the solder wettability of the first terminal may decrease. Accordingly, the Pd content in the composite covering layer is preferably not greater than 7 atomic % in order to increase solder wettability. For the same purpose, the Pd content is more preferably not greater than 6.5 atomic %, still more preferably not greater than 6 atomic %, still more preferably not greater than 5.5 atomic %, and particularly preferably not greater than 5 atomic %. The Pd content in the composite covering layer may be not less than 1 atomic % in order to ensure that the Sn—Pd based alloy phase is present in a sufficient amount.

In the surface of the first contact portion, i.e., in the surface of the composite covering layer, the Sn phase and the Sn—Pd based alloy phase are both present. A Sn oxide film may be present on the surface of the composite covering layer to the extent that it does not adversely affect the achievement of reduced insertion force and ensuring of good solder wettability.

The abundance ratio of the Sn phase and the Sn—Pd based alloy phase in the surface of the composite covering layer may be defined, for example, by the volume fractions of the Sn phase and the Sn—Pd based alloy phase in the composite covering layer. Specifically, the volume fraction of the Sn—Pd based alloy phase in the composite covering layer preferably ranges from 1.0 to 95.0 vol. % and more preferably ranges from 50.0 to 95.0 vol. %. In such cases, the effect of reducing the contact resistance and the effect of reducing the coefficient of friction can be produced in a balanced manner. When the volume fraction of the Sn—Pd based alloy phase is less than 1.0 vol. %, the content of the relatively hard Sn—Pd based alloy phase is insufficient and therefore the effect of reducing the coefficient of friction may be insufficient. On the other hand, when the volume fraction of the Sn—Pd based alloy phase is greater than 95.0 vol. %, the content of the relatively soft Sn phase is insufficient and therefore the effect of reducing the contact resistance may be insufficient.

The abundance ratio of the Sn phase and the Sn—Pd based alloy phase in the surface of the composite covering layer may also be defined by the area fraction of the exposed portions of the Sn—Pd based alloy phase in the surface of the composite covering layer. Normally, the value of the area fraction approximately corresponds to the value of the above-described volume fraction of the Sn—Pd based alloy phase. The area fraction of exposed portions of the Sn—Pd based alloy phase in the surface of the composite covering layer is preferably not less than 1.0%, preferably not less than 10%, more preferably not less than 20%, and particularly more preferably not less than 50%. In such a case, the presence of the relatively hard Sn—Pd based alloy phase enables an effective reduction in coefficient of friction during sliding movement.

The area fraction of the exposed portions of the Sn—Pd based alloy phase in the surface of the composite covering layer is preferably not greater than 95%, and more preferably not greater than 80%. In such a case, the presence of the relatively soft Sn phase facilitates a reduction in contact resistance. In order to achieve both a reduction in coefficient of friction and a reduction in contact resistance, the area fraction more preferably ranges from 1.0% to 95% and even more preferably ranges from 50% to 95%.

The area fraction of the exposed portions of the Sn—Pd based alloy phase in the surface of the composite covering layer can be calculated in the following manner. Firstly, the composite covering layer may be immersed in an etchant that can selectively etch the Sn phase alone without etching the Sn—Pd based alloy phase to dissolve and remove the Sn phase. Examples of the etchant that may be used include an aqueous solution containing 10 g of sodium hydroxide and 1 g of p-nitrophenol dissolved in 200 ml of distilled water.

Next, a SEM (scanning electron microscope) image of the surface of the composite covering layer, from which the Sn phase has been removed, is acquired. The SEM image is subjected to a binarization process based on the contrast to obtain a binarized image. From the binarized image, the area fraction of the Sn—Pd based alloy phase can be determined. The contrast threshold value in the binarization process may be set such that the contours of the Sn—Pd based alloy phase in the binarized image approximately correspond to the contours of the Sn—Pd based alloy phase in the SEM image.

The composite covering layer preferably has a glossiness in a range of 10 to 300% at the surface. In such a case, the ratio between the exposed portion of the Sn phase and the exposed portion of the Sn—Pd based alloy phase in the surface of the composite covering layer falls within an appropriate range, so that the effect of reducing the coefficient of friction and the effect of reducing the contact resistance can be produced in a balanced manner. When the glossiness is greater than 300%, the area fraction of the exposed portions of the Sn—Pd based alloy phase in the surface of the composite covering layer is low, and therefore the effect of reducing the coefficient of friction may be insufficient. On the other hand, when the glossiness is less than 10%, the area fraction of the exposed portion of the Sn phase in the surface of the composite covering layer is low, and therefore the effect of reducing the contact resistance may be insufficient.

The composite covering layer structured as described above may be formed, for example, using an electroplating method to deposit a Pd plated film and a Sn plated film in sequence on the first base material and then performing a reflow process to heat the plated films to thereby alloy the Sn and Pd. In such a case, the thickness of the Pd plated film may be suitably selected from a range of 10 to 50 nm, for example. The thickness of the Sn plated film may be suitably selected from a range of 1 to 2 μm, for example. The heating temperature in the reflow process may be set to approximately 230 to 400° C. The method described above is merely illustrative and may be modified as necessary.

The composite covering layer may be deposited directly on the first base material or may be deposited on a first intermediate layer to be interposed between the composite covering layer and the first base material. Examples of the first intermediate layer that may be used include a metal layer that can act to improve adhesion of the composite covering layer to the first base material and a metal layer that can act to inhibit diffusion of the components of the first base material into the composite covering layer.

The first intermediate layer may be made up of one metal layer or may be made up of two or more metal layers. Examples of the material of the first intermediate layer that may be used include Ni (nickel), a Ni alloy, Cu, a Cu alloy, and Co (cobalt). A suitable material may be selected depending on, for example, the material of the first base material or functions desired in the first intermediate layer.

Second Terminal

In the second terminal, a second base material, which forms the terminal shape, is made of a metal material. That is, as with the first base material, the second base material may be suitably made of Cu, Al, Fe, or an alloy including any of these metals.

A second contact portion including a Cu—Sn alloy layer and a Sn layer is present over the second base material. One or more portions of the Cu—Sn alloy layer are covered with the Sn layer, and the remaining portion(s) thereof is (are) exposed to the surface. It suffices if the Cu—Sn alloy layer and the Sn layer are present at least in the second contact portion or instead it may be present over the entire area of the second terminal. The Cu—Sn alloy layer and Sn layer structured as described above may be formed, for example, by forming a Sn plated film on the second base material and depositing a Cu plated film thereon, and performing a reflow process on them to alloy the Sn and Cu.

The Sn layer is a layer including Sn as the main component and may include, in addition to Sn as the main component, an element that can be contained in a second intermediate layer described later, an element that constitutes the second base material, unavoidable impurities, and other substances. The Cu—Sn alloy layer is a layer including a Cu—Sn alloy as the main component and may include, in addition to the alloy as main component, an element that can be contained in the second intermediate layer, an element that constitutes the second base material, unavoidable impurities, and other substances.

The composition ratio between Cu and Sn in the Cu—Sn alloy layer is not particularly limited but it is preferred that an intermetallic compound having a composition represented by $Cu_6Sn_5$ be contained in the Cu—Sn alloy layer. The particular intermetallic compound has a higher hardness than Sn and has both high heat resistance and high corrosion resistance. Thus, the second terminal that includes the particular intermetallic compound has even higher durability.

The second intermediate layer, which may be formed of Ni, may be present between the second base material and the Cu—Sn alloy layer. The presence of the second intermediate layer can prevent diffusion of the metal elements that constitute the second base material into the Cu—Sn alloy layer and the Sn layer. In addition, the second intermediate layer can act to enhance adhesion of the second base material to the Cu—Sn alloy layer and Sn layer. Thus, the second terminal exhibits further enhanced durability when it includes the second intermediate layer. To provide the functions and effects described above sufficiently, the thickness of the second intermediate layer is more preferably not greater than 3 μm.

In the surface of the second contact portion, the Cu—Sn alloy region corresponding to an exposed portion(s) of the Cu—Sn alloy layer and the Sn region corresponding to an exposed portion(s) of the Sn layer coexist. Examples of the form of coexistence of the Cu—Sn alloy region and the Sn region include a structure in which the Cu—Sn alloy region is scattered in the Sn region and a structure in which the Sn region is scattered in the Cu—Sn alloy region. It is preferred to employ the structure in which the Cu—Sn alloy region is scattered in the Sn region when it is intended to further enhance the effect of reducing the contact resistance and the effect of reducing the coefficient of friction.

As for the second terminal, a reduction in coefficient of friction in combination with a reduction in contact resistance can be readily achieved by appropriately controlling the area fraction of the Cu—Sn alloy region in the surface. The area fraction of the Cu—Sn alloy region can be calculated, for example, by surface observation using an electron microscope, a probe microscope, or other means. Also, the area fraction of the Cu—Sn alloy region can be controlled to be within a suitable range by controlling the glossiness of the surface, which can be determined by measurement by the method described below, to be within a specified range.

Specifically, by controlling the glossiness of the second contact portion to be within a range of 50 to 1000%, a reduction in coefficient of friction in combination with a reduction in contact resistance can be readily achieved. The Cu—Sn alloy region exposed in the surface of the second contact portion has a glossiness smaller than that of the Sn region, and therefore as the area fraction of the Cu—Sn alloy region increases, the glossiness generally decreases. Thus, by controlling the glossiness to be within the specified range, the area fraction between the Cu—Sn alloy region and the Sn region in the surface of the second contact portion can be controlled to fall within an appropriate range, which produces the effect of reducing the contact resistance and the effect of reducing the coefficient of friction in a balanced manner.

When the glossiness is greater than 1000%, the area fraction of the Cu—Sn alloy region is excessively small and therefore the effect of reducing the coefficient of friction may be insufficient. On the other hand, when the glossiness is less than 50%, the area fraction of the Cu—Sn alloy region is excessively large and therefore the effect of reducing the contact resistance may be insufficient. Accordingly, to achieve both a reduction in contact resistance and a reduction in coefficient of friction, it is preferable to control the glossiness to be within a range of 50 to 1000%. For the same purpose, it is more preferable to control the glossiness to be within a range of 100 to 800%.

The glossiness of the second contact portion is represented by a value measured using a method in accordance with JIS Z 8741-1997 at an incident angle of 20°.

Furthermore, when the glossiness of the Cu—Sn alloy layer ranges from 10 to 80% as measured after dissolving and removing only the Sn layer, it is also possible to readily achieve a reduction in coefficient of friction in combination with a reduction in contact resistance as with the case described above. This is believed to be due to the following reason.

The Cu—Sn alloy region has a smoother surface than the surface of the Cu—Sn alloy layer covered with the Sn layer and therefore, in the state in which the Sn layer alone has been dissolved and removed, the glossiness of the Cu—Sn alloy region is higher than the glossiness of the Cu—Sn alloy layer covered with the Sn layer. Thus, as the area fraction of the Cu—Sn alloy region increases, the glossiness generally increases. Accordingly, by controlling the glossiness to be within the specified range, the area fraction between the Cu—Sn alloy region and the Sn region in the surface of the second contact portion can be controlled to fall within an appropriate range, which in turn easily enables a reduction in contact resistance in combination with a reduction in coefficient of friction.

When the glossiness is less than 10%, the area fraction of the Cu—Sn alloy region is excessively small and therefore the effect of reducing the coefficient of friction may be insufficient. On the other hand, when the glossiness is greater than 80%, the area fraction of the Cu—Sn alloy region is excessively large and therefore the effect of reducing the contact resistance may be insufficient. Accordingly, to achieve both a reduction in contact resistance and a reduction in coefficient of friction, it is preferable to control the glossiness to be within a range of 10 to 80%. For the same purpose, it is more preferable to control the glossiness to be within a range of 15 to 70%.

The glossiness of the Cu—Sn alloy layer is represented by a value measured using a method in accordance with JIS Z 8741-1997 at an incident angle of 60°.

The Sn layer can be removed by immersion in an etchant that can selectively etch the Sn layer alone without etching the Cu—Sn alloy layer. Examples of the etchant that may be used include an aqueous solution containing 10 g of sodium hydroxide and 1 g of p-nitrophenol dissolved in 200 ml of distilled water.

Both the glossiness of the second contact portion and the glossiness of the Cu—Sn alloy layer described above can be adjusted by the methods exemplified below. Specifically, one method that may be employed is to alter the conditions of the surface treatment (described later) for forming irregularities in the surface of the second base material to thereby adjust the density and size of the projections on the surface. Another method that may be employed is to vary the thickness of the Sn layer to adjust the amount of the Sn layer filling the corresponding recesses (described later) that appear in the surface of the Cu—Sn alloy layer. The latter method is preferred in view of the accuracy of glossiness control and ease of processing.

The irregularities including projections and recesses may be previously formed in the surface of the second base material. In such a case, it is possible to readily provide the structure in which the Cu—Sn alloy layer is formed along the irregularities, and corresponding recesses that appear in the Cu—Sn alloy layer due to the recesses are filled with the Sn layer. In the above structure, portions of the Cu—Sn alloy layer formed near the tops of the projections can be easily exposed to the surface of the second contact portion. That is, in this case, it is possible to more easily realize the state in which the Cu—Sn alloy region and the Sn region coexist in the surface of the second contact portion. As a result, reduction of both contact resistance and coefficient of friction is reliably achieved. The above-described irregularities in the surface of the second base material may be formed by conventionally known processes such as mechanical polishing for example.

In the case where the second contact portion has the above-described structure, if the amount of the Sn layer filling is insufficient, an excessively large height difference may occur between the Cu—Sn alloy region and the Sn region, which are exposed in the surface. If the height difference described above is excessively large, it becomes difficult to bring both the Cu—Sn alloy region and the Sn region into contact with the first contact portion, which may result in an increased contact resistance and coefficient of friction. In order to circumvent such problems, it is preferred to control the surface profile so that the arithmetic mean roughness Ra on the surface of the second contact portion is 3.0 μm or less when measured in any direction and, at least in one direction, Ra is 0.15 μm or less as measured in the direction. Control of the surface profile may be carried out, for example, by controlling the height difference in the irregularities formed in the second base material or adjusting the amount of Sn layer filling.

Furthermore, in the case where the second contact portion has the above-described structure, it is preferred that the sum of the thickness of the Cu—Sn alloy layer and the thickness of the Sn layer is within a range of 0.5 to 5.0 μm. This makes it possible to more readily achieve both a reduction in contact resistance and a reduction in coefficient of friction. When the sum of the thicknesses is less than 0.5 μm, the thicknesses of the Cu—Sn alloy layer and the Sn layer are both insufficient and therefore the effect of reducing the contact resistance and the effect of reducing the coefficient of friction may be insufficient. On the other hand, when the sum of the thicknesses is greater than 5 μm, the thickness of the relatively hard Cu—Sn alloy layer is excessively thick, which may result in decreased formability and decreased productivity for the second terminal.

The thickness of the Cu—Sn alloy layer is preferably within a range of 0.1 to 3.0 μm. If the thickness of the Cu—Sn alloy layer is less than 0.1 μm, the effect of reducing the coefficient of friction may become insufficient. On the other hand, if the thickness of the Cu—Sn alloy layer is greater than 3.0 μm, a decrease in formability and a decrease in productivity for the second terminal may occur.

As for the thickness of the Sn layer, it is preferred that the average thickness is within a range of 0.2 to 5.0 μm and that the maximum thickness at the corresponding recesses is within a range of 1.2 to 20 μm. When the thickness of the Sn layer is thinner than the above specified ranges, the effect of reducing the contact resistance may become insufficient. When the thickness of the Sn layer is thicker than the above specified range, the effect of reducing the coefficient of friction may become insufficient.

EMBODIMENT

Embodiment 1

Figure 2:
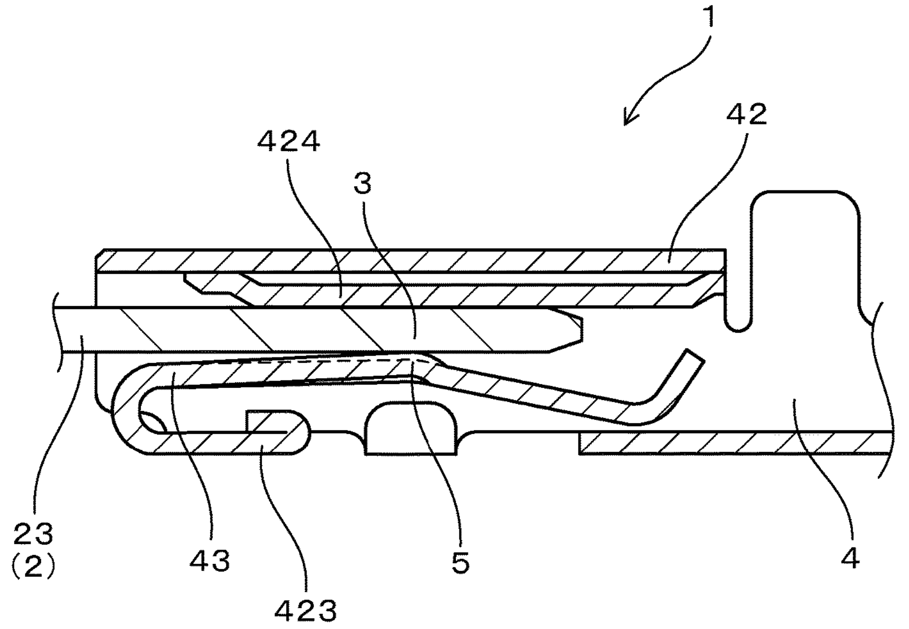
FIG. 2 is a partial cross-sectional view of a state in which a tab portion of the first terminal is inserted into a tubular portion of the second terminal, according to Embodiment 1.
Figure 3:
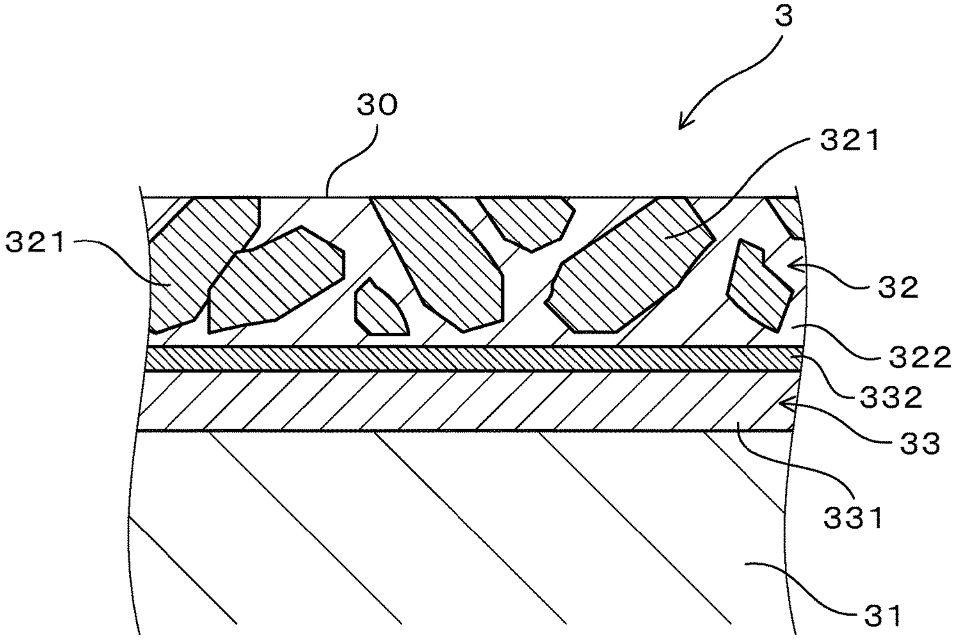
FIG. 3 is a cross-sectional view of a composite covering layer according to Embodiment 1.

Embodiments of the terminal pair will be described with reference to the drawings. As illustrated in FIG. 2, a terminal pair 1 is configured to be used by bringing a first contact portion 3 provided in a first terminal 2 and a second contact portion 5 provided in a second terminal 4 into contact with each other. As illustrated in FIG. 3, the first contact portion 3 includes a composite covering layer 32 that is formed over a first base material 31 made of a metal and has two phases that are a Sn—Pd based alloy phase 321 and a Sn phase 322 with one of the two phases being dispersed in the other. In a surface 30 of the first contact portion 3, the Sn—Pd based alloy phase 321 and the Sn phase 322 coexist.

Figure 4:
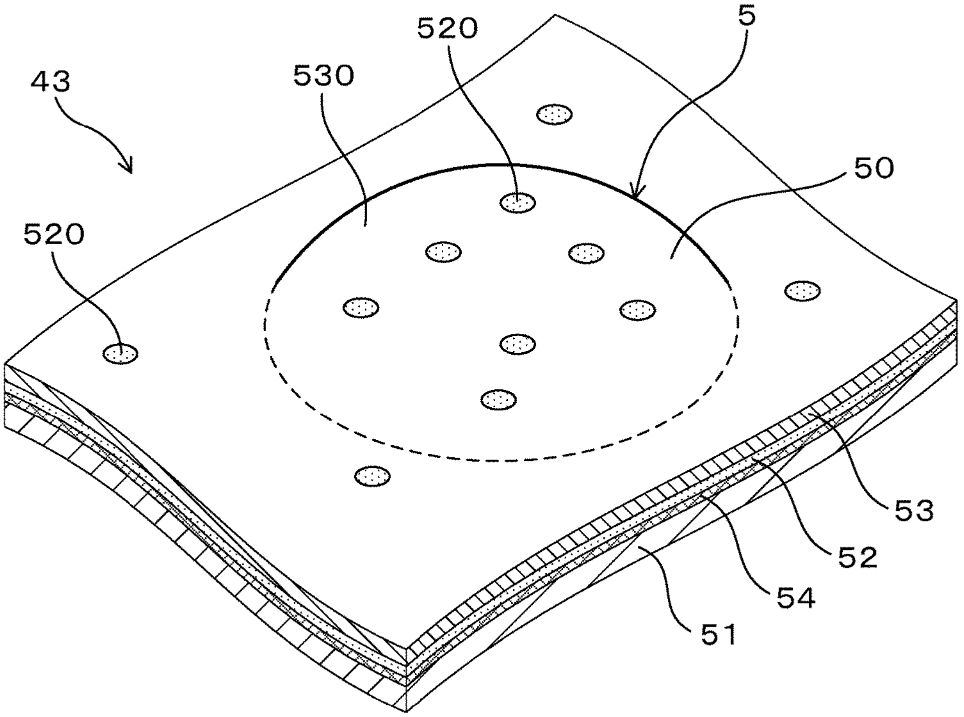
FIG. 4 is a perspective view of a second contact portion according to Embodiment 1.

As illustrated in FIG. 4, the second contact portion 5 includes a Cu—Sn alloy layer 52 formed over a second base material 51 made of a metal and a Sn layer 53 covering part of portions of the Cu—Sn alloy layer 52. In a surface 50 of the second contact portion 5, a Cu—Sn alloy region 520 corresponding to an exposed portion of the Cu—Sn alloy layer 52 and a Sn region 530 corresponding to an exposed portion of the Sn layer 53 coexist. A detailed description is given below.

First Terminal 2

Figure 1B:
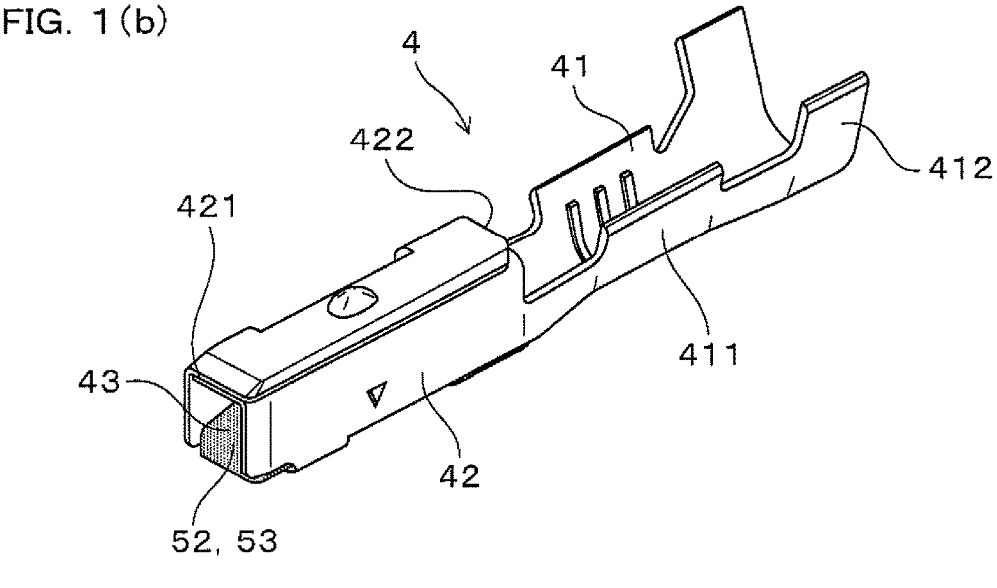

In this embodiment, the first terminal 2 having the composite covering layer 32 constitutes a male terminal (see FIG. 1(*a*)) of the terminal pair 1. The first terminal 2 includes a barrel portion 21, to which an electrical cable is to be attached, a tubular portion 22 connected to the barrel portion 21, and a tab portion 23 connected to the tubular portion 22. The first terminal 2 is generally rod-shaped with the barrel portion 21, the tubular portion 22, and the tab portion 23 being linearly aligned. The first terminal 2 of this embodiment includes the composite covering layer 32 only on the tab portion 23. As illustrated in FIG. 2, the first contact portion 3 is provided in the tab portion 23.

As illustrated in FIG. 1(*a*), the tubular portion 22 has a generally rectangular tubular shape extending in a longitudinal direction of the first terminal 2. The tab portion 23 is connected to one open end 221 of the tubular portion 22 and the barrel portion 21 is connected to the other open end 222. The tab portion 23 extends in a longitudinal direction of the first terminal 2 from the one open end 221 of the tubular portion 22 and the cross section of the tab portion 23 perpendicular to the extending direction has a flat shape. The barrel portion 21 includes a wire barrel portion 211, to which a conductor exposed at the end portion of the electrical cable is to be secured, and an insulation barrel portion 212, to which the electrical cable is to be secured through its insulating coating.

As illustrated in FIG. 2, when the tab portion 23 has been inserted into a later-described tubular portion 42 of the second terminal 4, the tab portion 23 is pressed against a top plate portion 424 of the tubular portion 42 by a resilient portion 43. This establishes an electrical connection between the first contact portion 3 provided in the tab portion 23 and the second contact portion 5 provided in the resilient portion 43.

The first terminal 2 can be produced by the method exemplified below. Firstly, the sheet-shaped first base material 31 made of a Cu alloy is provided and subjected to pretreatment processes including degreasing cleaning or the like. Then, the surface of the first base material 31 is covered with a masking material in such a manner as to form a plated film only on the portion to be formed into the tab portion 23. When the composite covering layer 32 is to be formed over the entire area of the first terminal 2, the masking material is not necessary.

Then, an electroplating process is performed to deposit a Ni plated film having a thickness of 1 to 3 μm, a Pd plated film having a thickness of 10 to 50 nm, and a Sn plated film having a thickness of 1 to 2 μm in sequence on the first base material 31. After the plated films have been formed, a reflow process involving heating at temperatures of 230 to 400° C. is performed to alloy the Sn and Pd to thereby form the composite covering layer 32. During this time, Ni may diffuse into the composite covering layer 32 from the Ni plated film to form a Ni—Sn alloy. In the case where the conditions of this embodiment are employed, a first intermediate layer 33 is formed between the composite covering layer 32 and the first base material 31 as illustrated in FIG. 3. The first intermediate layer 33 includes a Ni layer 331 made of Ni that has not diffused into the composite covering layer 32 and a Ni—Sn alloy layer 332.

Then, the first base material 31 provided with the composite covering layer 32 is subjected to press-forming to be formed into the shape of the first terminal 2. In the manner described above, the first terminal 2 can be produced.

Second Terminal 4

The second terminal 4 including the Cu—Sn alloy layer 52 and the Sn layer 53 constitutes a female terminal (see FIG. 1(*b*)) of the terminal pair 1. The second terminal 4 is substantially rod-shaped and includes a barrel portion 41, to which an electrical cable is to be attached, and the tubular portion 42 connected to the barrel portion 41.

The tubular portion 42 has a substantially rectangular tubular shape extending in a longitudinal direction of the second terminal 4. One open end 421 of the tubular portion 42 is open so that the tab portion 23 can be inserted therethrough. The barrel portion 41 is connected to the other open end 422. As with the first terminal 2, the barrel portion 41 includes a wire barrel portion 411 and an insulation barrel portion 412.

As illustrated in FIG. 2, the resilient portion 43 is provided within the tubular portion 42. The resilient portion 43 is formed by folding a part of a bottom plate portion 423 of the tubular portion 42 internally backward. The resilient portion 43 presses the tab portion 23 inserted in the tubular portion 42 against the top plate portion 424 opposing the bottom plate portion 423. The second terminal 4 of this embodiment includes the Cu—Sn alloy layer 52 and the Sn layer 53 only on the resilient portion 43.

The second contact portion 5, which projects toward the top plate portion 424 so as to have a hemispherical shape, is formed at the approximately center of the resilient portion 43 in the longitudinal direction. When the tab portion 23 has been inserted into the tubular portion 42, the second contact portion 5 is pressed against the tab portion 23 by the pressing force of the resilient portion 43. This establishes an electrical connection between the first contact portion 3 and the second contact portion 5.

The second terminal 4 can be produced by the method exemplified below. Firstly, the sheet-shaped second base material 51 made of a Cu alloy is provided and subjected to pretreatment processes including degreasing cleaning or the like. The second base material 51 has irregularities including recesses and projections previously formed in its surface. Then, the surface of the second base material 51 is covered with a masking material in such a manner as to form a plated film only on the portion to be formed into the resilient portion 43. When the Cu—Sn alloy layer 52 and the like are to be formed over the entire area of the second terminal 4, the masking material is not necessary.

Then, an electroplating process is performed to deposit a Ni plated film, a Cu plated film, and a Sn plated film in sequence on the second base material 51. Then, a reflow process is performed on the second base material 51 to alloy the Cu and Sn. Thus, the Cu—Sn alloy layer is formed along the irregularities of the second base material 51. Part of the Sn that has not been alloyed in the process melts in the reflow process and fills the corresponding recesses in the Cu—Sn alloy layer 52 to form the Sn layer 53. In the case where the conditions of this embodiment are employed, a second intermediate layer 54 constituted by the Ni plated film is formed between the second base material 51 and the Cu—Sn alloy layer 52 as illustrated in FIG. 4.

Then, the second base material 51 provided with the Cu—Sn alloy layer 52 and the Sn layer 53 is subjected to press-forming to be formed into the shape of the second terminal 4. In the manner described above, the second terminal 4 can be produced.

Next, the functions and effects of this embodiment are described. The terminal pair 1 is made up of the first terminal 2 including the first contact portion 3 and the second terminal 4 including the second contact portion 5. The first contact portion 3 and the second contact portion 5 each have the particular structure. As a result, the coefficient of friction for sliding movement between the first contact portion 3 and the second contact portion 5 can further be reduced compared with the case in which two first contact portions 3 are slidingly moved against each other or the case in which two second contact portions 5 slidingly moved against each other.

The terminal pair 1 of this embodiment can be used by being attached to the terminal portions or another portions of electrical cables constituting an automotive wire harness, for example. In this embodiment, the exemplary terminal pair 1 described above is configured such that the first terminal 2 including the composite covering layer 32 is a male terminal and the second terminal 4 including the Cu—Sn alloy layer 52 and the Sn layer 53 is a female terminal, but instead the first terminal 2 may be provided as a female terminal and the second terminal 4 may be provided as a male terminal.

Embodiment 2

This embodiment provides an exemplary connector pair 10 including a terminal pair formed of connector pins and female terminals. The connector pair 10 is made up of a first connector 10*a* (see FIGS. 5 and 6) including a plurality of first terminals 20 each having the composite covering layer 32 and a second connector (not illustrated) including a plurality of second terminals 4 each having the Cu—Sn alloy layer 52 and the Sn layer 53. The locations and the numbers of the terminals provided in each of the connectors may be changed appropriately depending on the intended use.

Figure 5:
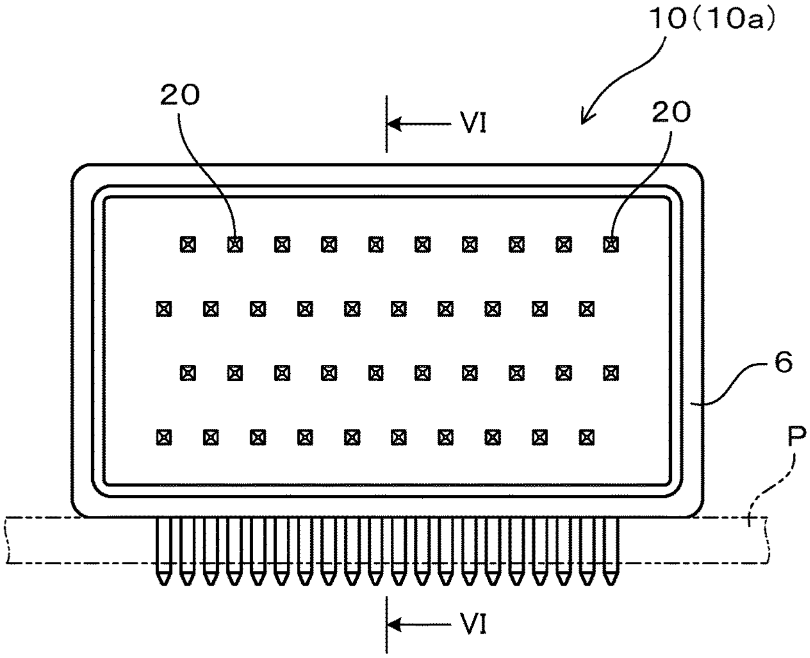
FIG. 5 is a front view of a first connector including a plurality of the first terminals, according to Embodiment 2.
Figure 6:
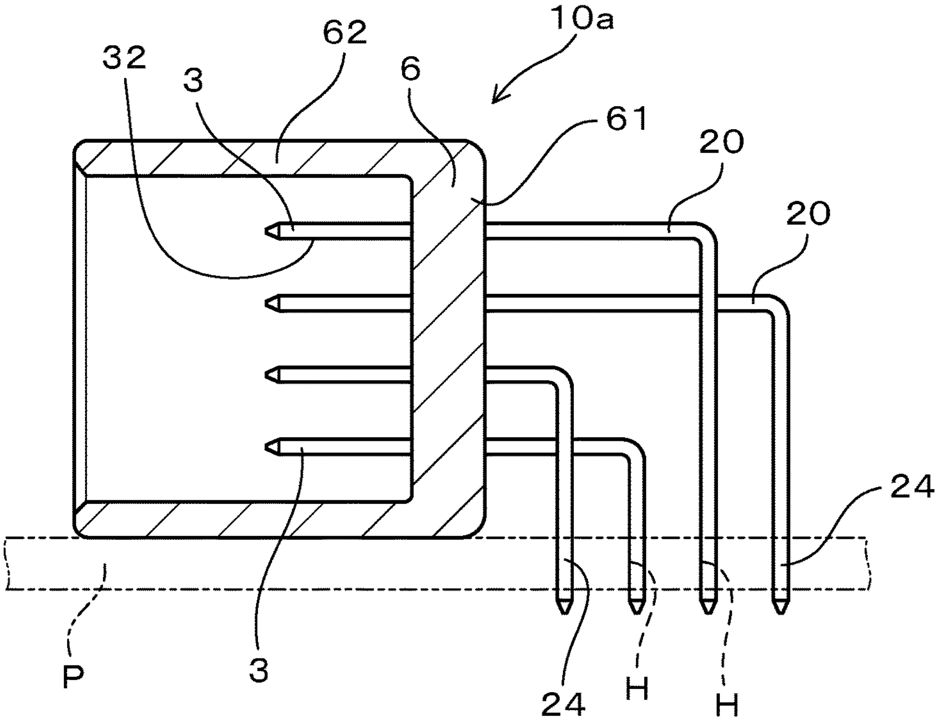
FIG. 6 is a cross-sectional view taken along the line VI-VI in the direction of the arrows in FIG. 5.

The first connector 10*a* is configured as a PCB connector and includes a plurality of first terminals 20 disposed passing through a housing 6. As illustrated in FIGS. 5 and 6, the housing 6 has a generally rectangular parallelopiped shape and includes a bottom wall portion 61, through which the second terminals 4 pass, and side wall portions 62 that rise from outer peripheral portions of the bottom wall portion 61.

Although not illustrated in the drawings, the second connector includes a housing and a plurality of the second terminals 4 disposed passing through the housing. The housing of the second connector is formed so that it can be fitted to the housing 6 of the first connector 10*a*. The second terminals 4 are positioned at locations where the first contact portions 3 are to be inserted within the tubular portion 42 in the state in which the two housings are fitted together. The second terminals 4 of this embodiment are female terminals having a configuration similar to that of the first embodiment.

The first terminal 20 of this embodiment is configured as a connector pin and has the first contact portion 3 at one end thereof and a soldering portion 24 at the other end. As illustrated in FIG. 6, the first terminal 20 extends from the first contact portion 3 positioned within the housing 6 toward the bottom wall portion 61. Further, the first terminal 20 passes through the bottom wall portion 61 to project outwardly from the housing 6 and is bent between the bottom wall portion 61 and the soldering portion 24 at a right angle. The soldering portion 24 is configured to be inserted into a through hole H in a printed circuit board P to be connected to the circuit on the printed circuit board P by soldering.

Figure 7:
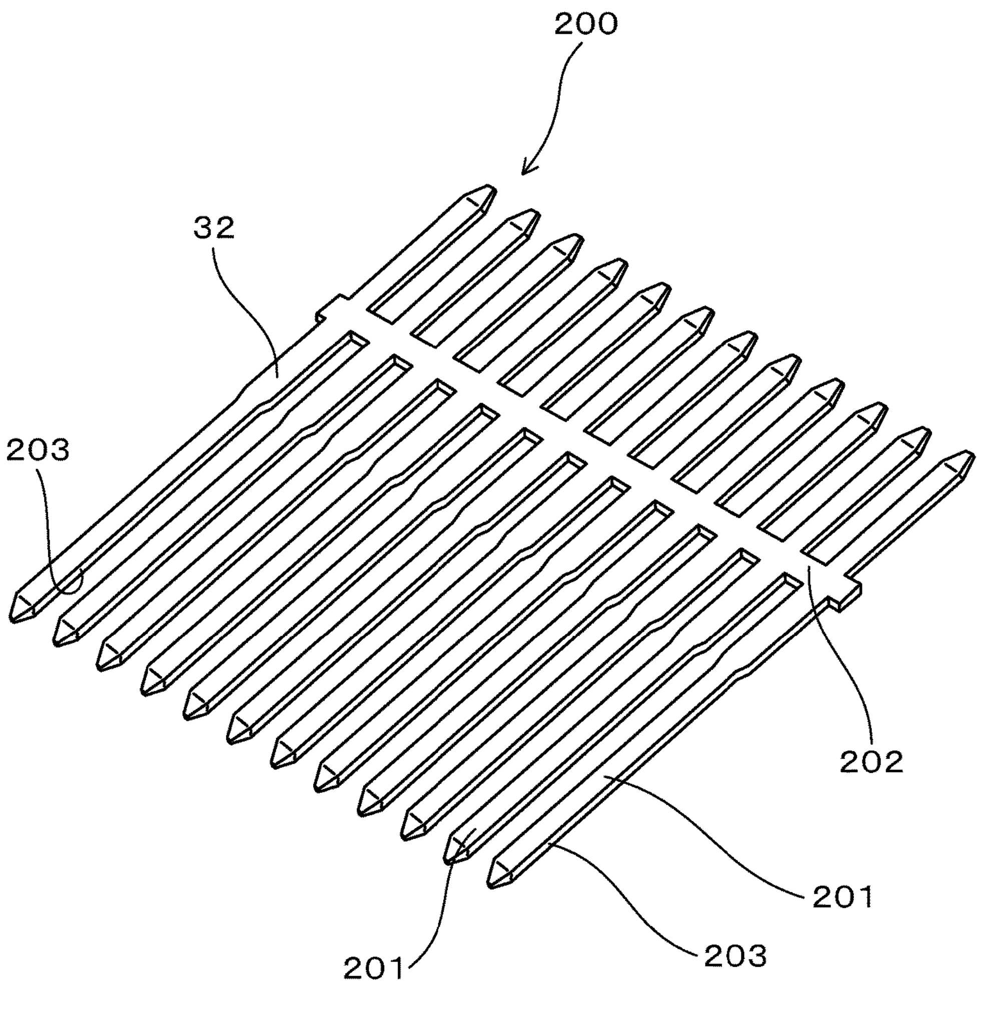
FIG. 7 is a perspective view of a terminal intermediate according to Embodiment 2.

The first terminal 20 of this embodiment may be produced from a sheet blank or may be produced from a wire rod. In the case of producing it from a sheet blank, a punching process is performed and then the composite covering layer 32 is formed over the first base material 31 in a manner similar to that of the first embodiment to produce a terminal intermediate 200 as illustrated in FIG. 7. The terminal intermediate 200 is configured such that a plurality of pin portions 201 to be formed into the first terminals 20 are connected together via a carrier portion 202. The first connector 10*a* can be obtained by performing insert molding to secure the terminal intermediate 200 to the housing 6 and then removing the carrier portion 202.

In the case of producing the first terminal 20 by the method described above, approximately the entire surface of the first terminal 20 including fracture surfaces 203 (see FIG. 7) formed by the punching process is covered by the composite covering layer 32 and therefore the first base material 31 is prevented from being exposed to the surface. As a result, the first terminal 20 exhibits excellent solder wettability and thus a good electrical connection between the soldering portion 24 and the printed circuit board P can be maintained over a long period of time.

Instead of a sheet blank, a wire rod may be used for the first base material 31. Specifically, the composite covering layer 32 can be formed by forming the plated films on the surface of a wire rod and then performing a reflow process on them. Thereafter, the wire rod can be formed into the shape of connector pins by press-forming or another process and then it can be secured to the housing 6 by insert molding to thereby produce the first connector 10*a*. In this case, too, approximately the entire surface of the first terminal 20 is covered by the composite covering layer 32, and therefore a good electrical connection between the soldering portion 24 and the printed circuit board P can be maintained over a long period of time.

The other features are the same as those of Embodiment 1. Among the reference characters used in FIGS. 5 to 7, reference characters that are the same as those used in the first embodiment represent the same components, elements, or the like as those in Embodiment 1.

As in this embodiment, by employing the terminal pair having the particular structure for the connector pair 10, the insertion force for fitting of the connector pair 10 can be further reduced. The effect of reducing the insertion force markedly increases with increasing number of terminals included in each connector. That is, in multi-terminal connectors having many terminals, the area of sliding portions between the terminals is increased compared with single-terminal connectors and therefore a greater insertion force is required. In the multi-terminal connector using the terminal pair having the abovementioned particular structure, each terminal in the terminal pair has a reduced coefficient of friction and therefore the friction force due to the sliding movement between the first terminal 20 and the second terminal 4 can be reduced. Consequently, a reduction in the insertion force in the multi-terminal connector is effectively achieved.

In this embodiment, it is preferred that the first terminals 20 having the composite covering layer 32 be employed as connector pins and the second terminals 4 having the Cu—Sn alloy layer 52 and the Sn layer 53 be employed as female terminals. In the case of employing the second terminals 4 as connector pins, the plating process for forming the Cu—Sn alloy layer 52 and the Sn layer 53 on approximately the entire surfaces of the second terminals 4 needs to be performed after the second base material 51 is formed into the terminal shape by punching or another process. However, in this case, because of deformation associated with the forming into the terminal shape, control of the surface profile of the second base material 51 is difficult. Thus, formation of the second contact portion 5 having the desired characteristics is difficult and therefore the effect of reducing the contact resistance and the effect of reducing the coefficient of friction may become insufficient. On the other hand, in the case of employing the first terminals 20 as connector pins, such a problem can be avoided because the composite covering layer 32 is to be formed after the first base material 31 is formed into the terminal shape.

EXAMPLE

In this example, the coefficient of friction for sliding movement between the first contact portion 3 and the second contact portion 5 was measured. The measurement of the coefficient of friction was made using a fixed specimen and a movable specimen prepared by the following procedure. The shapes of the fixed specimen and movable specimen simulated those of the first contact portion 3 (tab portion 23) and second contact portion 5 in Embodiment 1.

Fixed Specimen

Production Method

The first base material 31 made of a Cu alloy sheet was provided and subjected to pretreatment processes including degreasing cleaning or the like. Then, an electroplating process was performed to deposit a Ni plated film having a thickness of 2.0 μm, a Pd plated film having a thickness of 20 nm, and a Sn plated film having a thickness of 1.0 μm in sequence on the first base material 31. Then, a reflow process involving heating at 300° C. in an air atmosphere was performed on the plated films to produce the fixed specimen. The Pd concentration in the composite covering layer 32 of the fixed specimen of this example was found to be 3.0 atomic % as calculated from the thicknesses of the Sn plated film and the Pd plated film before the reflow process was performed, and the densities and atomic weights of the elements.

SEM (Scanning Electron Microscope) Observation

A flat sheet-shaped sample was cut from the fixed specimen and the cross section was observed using an SEM. The results confirmed that the fixed specimen had the structure in which the Ni layer 331, the Ni—Sn alloy layer 332, and the composite covering layer 32 were deposited in sequence on the first base material 31 (see FIG. 3). The results also confirmed that the composite covering layer 32 had a sea-island structure in which a sea phase was formed by the Sn phase 322 and an island phase formed by the Sn—Pd based alloy phase 321 was dispersed therein.

Next, the Sn phase 322 was removed from the sample by etching to acquire a SEM image of the sample surface after the etching. Although not illustrated in the drawings, in the surface after the Sn phase 322 had been removed, the Sn—Pd based alloy phase 321 having a substantially rectangular parallelopiped shape was present in dispersion. Between each Sn—Pd based alloy phase 321, the Ni—Sn alloy layer 322, which had been exposed by the removal of the Sn phase 322, was observed.

Then, the acquired SEM images were subjected to a binarization process based on the contrast. The area fraction of the Sn—Pd based alloy phase 321 was determined from the resulting binarized image and it was found that the area fraction of Sn—Pd based particles 312 exposed to the surface of the composite covering layer 32 was 70%.

Measurement of Glossiness

A flat sheet-shaped sample was cut from the fixed specimen to measure the glossiness of the surface using a variable gloss meter ("UGV-6P" manufactured by Suga Test Instruments Co., Ltd.), and the glossiness was found to be 60%.

Movable Specimen

Production Method

The sheet-shaped second base material 51 made of a Cu alloy was provided and subjected to pretreatment processes including degreasing cleaning or the like. The second base material 51 had irregularities 513 previously formed on its surface. Then, an electroplating process was performed to deposit a Ni plated film, a Cu plated film, and a Sn plated film in sequence on the second base material 51. Then, a reflow process was performed to heat the plated films. Then, the second base material 51 was subjected to press-forming to be provided with an embossed portion having a hemispherical shape with a radius of 1 mm. In the manner described above, a movable specimen having a layered structure corresponding to the second contact portion 5 (see FIG. 4) was produced.

SEM Observation

The surface of the movable specimen was observed using the SEM and it was found that the Cu—Sn alloy region 520, which looks darker than the Sn region 530, was scattered in the Sn region 530, which looks relatively bright (not illustrated). Furthermore, it was found that the spacing between the adjacent Cu—Sn alloy regions 520 was at least approximately 5 μm and at most approximately 97 μm. Furthermore, the average thickness of the Sn layer 53 and the thickness of the second intermediate layer 54 were each 1 μm.

Measurement of Glossiness

A flat sheet-shaped sample was cut from the movable specimen to measure the glossiness of the surface 50 using the variable gloss meter, and the glossiness was found to be 350%.

Then, the sample was immersed for 30 minutes in a previously prepared aqueous solution that can exclusively dissolve the Sn layer 53 to expose the Cu—Sn alloy layer 52. The glossiness of the Cu—Sn alloy layer 52 was measured in this state and found to be 35%. The aqueous solution contained 10 g of sodium hydroxide and 1 g of p-nitrophenol dissolved in 200 ml of distilled water. The temperature of the aqueous solution when the sample was immersed was room temperature.

Measurement of Coefficient of Friction

The movable specimen and the fixed specimen were superposed on each other in a vertical direction so that the embossed portion was contacted with the surface of the fixed specimen. In this state, a vertical load of 3 N was applied between the movable specimen and the fixed specimen by a piezo actuator. The movable specimen was forcibly moved in a horizontal direction at a rate of 10 mm/min, while the vertical load was being maintained. During the movement, the frictional force applied to the fixed specimen was measured by a load cell. The coefficient of friction was calculated by dividing the obtained frictional force by the vertical load.

Figure 8:
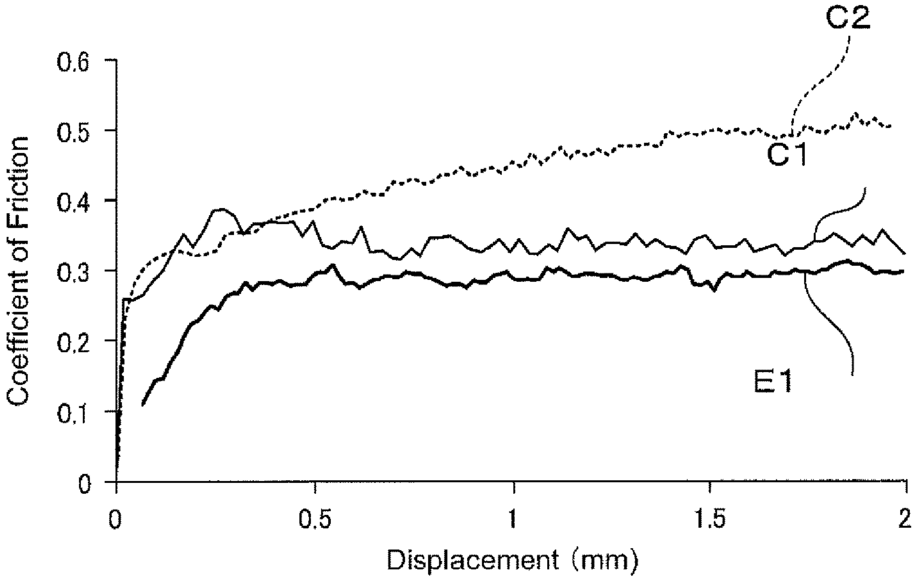
FIG. 8 is a graph showing results of measurement of coefficient of friction in Example.

The results of the measurement of coefficient of friction are shown in FIG. 8 (indicated by E1). In FIG. 8, the vertical axis represents the value of the coefficient of friction and the horizontal axis represents the amount of displacement of the movable specimen. For comparison with this example, FIG. 8 also shows the coefficient of friction (indicated by C1) in the case of slidingly moving two first contact portions 3 against each other and the coefficient of friction (indicated by C2) in the case of slidingly moving conventional contact portions, having a Sn plated film on their surfaces, against each other. Specifically, C1 indicates the results of measurement of coefficient of friction using a specimen formed by providing the stationary specimen with an embossed portion by press-forming to be used as a movable specimen. C2 indicates the results of measurement of coefficient of friction by slidingly moving a movable specimen against a fixed specimen, each produced from a conventional reflowed Sn-coated blank, i.e., a sheet blank which was made by forming a Sn plated film having a thickness of 1 μm on a Cu alloy sheet and then performing a reflow process thereon.

As can be seen from FIG. 8, the coefficient of friction (indicated by E1) for sliding movement between the first contact portion 3 and the second contact portion 5 was lower than the coefficient of friction (indicated by C1) between the two first contact portions 3 and the coefficient of friction (indicated by C2) between the conventional contact portions, and the low coefficient of friction was maintained for a long period of time. From the foregoing results, it is seen that the terminal pair 1 having the particular structure has a reduced coefficient of friction as compared with the conventional art while maintaining a low contact resistance.

The invention claimed is:

1. A terminal pair comprising a first terminal provided with a first contact portion and a second terminal provided with a second contact portion, and being configured to be used by bringing the first contact portion and the second contact portion into contact with each other, wherein the first contact portion comprises a composite covering layer formed over a first base material made of a metal, the composite covering layer comprising two phases that are a Sn—Pd based alloy phase and a Sn phase, one of the two phases being dispersed in the other of the two phases, the first contact portion has a surface including the Sn—Pd based alloy phase and the Sn phase, the second contact portion comprises a Cu—Sn alloy layer formed over a second base material made of a metal and a Sn layer covering part of the Cu—Sn alloy layer, the second contact portion has a surface including a Cu—Sn alloy region and a Sn region, the Cu—Sn alloy region corresponding to an exposed portion of the Cu—Sn alloy layer, the Sn region corresponding to an exposed portion of the Sn layer, and a coefficient of friction for sliding movement between the first contact portion and the second contact portion is lower than a coefficient of friction for sliding movement between two first contact portions slidingly moved against each other and between two second contact portions slidingly moved against each other.

2. The terminal pair according to claim 1, wherein the Sn—Pd based alloy phase is dispersed in the Sn phase.

3. The terminal pair according to claim 1, wherein a Pd content in the composite covering layer is equal to or less than 7 atomic %.

4. The terminal pair according to claim 1, wherein a volume fraction of the Sn—Pd based alloy phase in the composite covering layer ranges from 1.0 to 95.0 vol. %.

5. The terminal pair according to claim 1, wherein an area fraction of the Sn—Pd based alloy phase exposed in a surface of the composite covering layer ranges from 1.0 to 95%.

6. The terminal pair according to claim 1, wherein a glossiness of a surface of the composite covering layer ranges from 10 to 300%.

7. The terminal pair according to claim 1, wherein the Cu—Sn alloy region is scattered in the Sn region in the surface of the second contact portion.

8. The terminal pair according to claim 1, wherein a glossiness of the second contact portion ranges from 50 to 1000%.

9. The terminal pair according to claim 1, wherein a glossiness of the Cu—Sn alloy layer ranges from 10 to 80% as measured after dissolving and removing only the Sn layer.

10. The terminal pair according to claim 1, wherein the first terminal is a connector pin, and the second terminal is a female terminal.

11. A connector pair comprising the terminal pair according to claim 1, wherein the connector pair is configured to be used by fitting a first connector comprising the first terminal and a second connector comprising the second terminal to each other.

12. The terminal pair according to claim 2, wherein a Pd content in the composite covering layer is equal to or less than 7 atomic %.

13. The terminal pair according to claim 12, wherein a volume fraction of the Sn—Pd based alloy phase in the composite covering layer ranges from 1.0 to 95.0 vol. %.

14. The terminal pair according to claim 13, wherein an area fraction of the Sn—Pd based alloy phase exposed in a surface of the composite covering layer ranges from 1.0 to 95.0 vol. %.

15. The terminal pair according to claim 14, wherein a glossiness of the surface of the composite covering layer ranges from 10 to 300%.

16. The terminal pair according to claim 15, wherein the Cu—Sn alloy region is scattered in the Sn region in the surface of the second contact portion.

17. The terminal pair according to claim 16, wherein a glossiness of the second contact portion ranges from 50 to 1000%.

18. The terminal pair according to claim 17, wherein a glossiness of the Cu—Sn alloy layer ranges from 10 to 80% as measured after dissolving and removing only the Sn layer.

19. The terminal pair according to claim 18, wherein the first terminal is a connector pin, and the second terminal is a female terminal.

20. A connector pair comprising the terminal pair according to claim 19, wherein the connector pair is configured to be used by fitting a first connector comprising the first terminal and a second connector comprising the second terminal to each other.

* * * * *